United States Patent
Jeong et al.

(10) Patent No.: US 8,737,519 B2
(45) Date of Patent: May 27, 2014

(54) APPARATUS AND METHOD FOR CHANNEL CODING IN A COMMUNICATION SYSTEM

(75) Inventors: Hong-Sil Jeong, Seoul (KR); Hyun-Koo Yang, Seoul (KR); Seho Myung, Gyeonggi-do (KR); Kyeong-Cheol Yang, Seoul (KR); Kyung-Joong Kim, Chungcheongnam-do (KR); Seok-Ki Ahn, Gyeongsangbuk-do (KR)

(73) Assignees: Samsung Electronics Co., Ltd (KR); Postech Academy Industry Foundation (KR)

( * ) Notice: Subject to any disclaimer, the term of this patent is extended or adjusted under 35 U.S.C. 154(b) by 309 days.

(21) Appl. No.: 13/103,502

(22) Filed: May 9, 2011

(65) Prior Publication Data

US 2011/0274202 A1 Nov. 10, 2011

(30) Foreign Application Priority Data

May 7, 2010 (KR) ........................ 10-2010-0043228

(51) Int. Cl.
*H04L 27/00* (2006.01)
(52) U.S. Cl.
USPC ......................................................... 375/295
(58) Field of Classification Search
None
See application file for complete search history.

(56) References Cited

U.S. PATENT DOCUMENTS

| | | | | |
|---|---|---|---|---|
| 7,068,729 | B2 * | 6/2006 | Shokrollahi et al. | 375/296 |
| 8,315,306 | B2 * | 11/2012 | Xu et al. | 375/240.03 |
| 2008/0069242 | A1 * | 3/2008 | Xu et al. | 375/240.24 |
| 2008/0317243 | A1 * | 12/2008 | Ramprashad | 380/29 |
| 2009/0158114 | A1 * | 6/2009 | Shokrollahi | 714/752 |
| 2009/0189792 | A1 * | 7/2009 | Shokrollahi et al. | 341/51 |
| 2010/0100791 | A1 | 4/2010 | Abu-Surra et al. | |
| 2010/0100792 | A1 | 4/2010 | Abu-Surra | |
| 2011/0241911 | A1 * | 10/2011 | Yang et al. | 341/52 |
| 2012/0128009 | A1 * | 5/2012 | Yang et al. | 370/432 |

OTHER PUBLICATIONS

Alberto Tarable and Sergio Benedetto, "Graph-based LT and Raptor codes", ISIT 2008, Toronto, Canada, Jul. 6-11, 2008.*
Hongpeng Zhu, Gengxin Zhang, Guangxia Li, "A Novel Degree Distribution Algorithm of LT Codes", 2008 11th IEEE International Conference on Communication Technology Proceedings.*
Nicholas Bonello et al., "Reconfigurable Rateless Codes", IEEE Transactions on Wireless Communications, vol. 8, No. 11, Nov. 11, 2009.
Bharathram Sivasubramanian et al., "Fixed-Rate Raptor Code Performance over Correlated Rayleigh Fading Channels", CCECE 2007, Apr. 22, 2007.
Amin Shokrollahi., "Raptor Codes", IEEE Transactions on Information Theory, vol. 52, No. 6, Jun. 6, 2006.

* cited by examiner

*Primary Examiner* — Chieh M Fan
*Assistant Examiner* — Bahman Badipour
(74) *Attorney, Agent, or Firm* — The Farrell Law Firm, P.C.

(57) ABSTRACT

A method for channel coding by a transmitter in a communication system is provided. The method includes determining a degree of coded bits of a Luby-Transform (LT) code based on a coding rate of a pre-code and the number of coded bits of the LT code, selecting at least one associated bit used for coding of the coded bits of the LT code from among information bits of the LT code, depending on the determined degree, and generating the coded bits of the LT code by applying a coding function to the selected associated bits.

12 Claims, 4 Drawing Sheets

APPARATUS AND METHOD FOR CHANNEL CODING IN A COMMUNICATION SYSTEM

PRIORITY

This application claims priority under 35 U.S.C. §119(a) to a Korean Patent Application filed in the Korean Intellectual Property Office on May 7, 2010 and assigned Serial No. 10-2010-0043228, the contents of which are incorporated herein by reference.

BACKGROUND OF THE INVENTION

1. Field of the Invention

The present invention relates generally to an apparatus and method for channel coding in a communication system, and more particularly, to an apparatus and method for coding input bits using a fountain code as a channel coding technique.

2. Description of the Related Art

A fundamental purpose of a communication system is to deliver information over a communication channel without errors. When a communication channel has error-free fidelity, a recipient may receive the same data as the data transmitted by a sender, over the communication channel.

However, distortion of information due to noise, fading, and Inter-Symbol Interference (ISI) may occur in communication channels considered in the practical application, creating a need for techniques for overcoming this problem.

Recently, many studies have been conducted on error-correcting codes to increase reliability of communication by efficiently restoring the distortion of information.

In order to maximize data throughput, use of an error-correcting code is required, which is designed to have the optimal performance depending on the reliability of the communication channel and the characteristic of information to be transmitted. For example, a communication channel that usually has high fidelity but also has low reliability for a specific time period, needs to use an error-correcting code which is robust against burst errors.

For example, in an Internet-based protocol such as Transmission Control Protocol/Internet Protocol (TCP/IP), an Automatic Repeat reQuest (ARQ) technique is used as a method for overcoming the effects of packet loss.

In the ARQ technique, a receiver transmits an ACKnowledgement (ACK) signal to a transmitter upon normally receiving a packet, but transmits a Negative ACK (NACK) signal to the transmitter upon detecting an error in a packet. After transmitting a packet to the receiver, the transmitter retransmits the packet both when it has received a NACK signal for the packet from the receiver, and when it has failed to receive an ACK signal for the packet from the receiver.

The ARQ technique ensures efficient delivery of information in one-to-one communication between a transmitter and a receiver when there is a high-fidelity feedback channel over which the receiver may deliver information to the transmitter. However, efficiency of the ARQ technique is drastically reduced when one transmitter delivers information to a plurality of receivers or when a plurality of transmitters deliver information to a plurality of receivers. In addition, it is difficult for the ARQ technique to be applied when fidelity of a feedback channel is low or when the feedback channel is unavailable.

To solve these problems of the ARQ technique in a multi-to-multi communication system, erasure codes such as a fountain code have been disclosed.

The fountain code may also be called a rateless code because the amount of coded data is not predetermined when a coding rate of channel coding is expressed as the amount of original information divided by the amount of coded data. The fountain code may enable complete reception without error merely with unidirectional transmission even when bidirectional transmission of information is difficult, such as when a transmitter does not have sufficient information about a receiver(s) and when there are a large number of receivers.

A Raptor code, which is a type of fountain code, was developed by Amin Shokrollahi in 2004. The Raptor code has been adopted as the standard technology in the application layer of Digital Video Broadcasting-Handheld (DVB-H). The Raptor code has better performance than a Luby-Transform (LT) code, the existing fountain code, in terms of computation in a decoding process. The biggest drawback of the LT code is that the computation required to restore information bits from coded bits is nonlinear, whereas the Raptor code enables its decoding while maintaining coding computation within the linear range, thereby solving the shortcomings of the LT code.

Generally, a systematic code including information bits among bits (i.e., coded bits) of a codeword to be transmitted, exhibits excellent performance compared to a non-systematic code including no information bits among the bits of the codeword. However, the Raptor code disclosed to this date requires coding complexity of $O(k^2)$ for k information bits, in making a systematic code. Due to the high coding complexity, a Raptor code having the form of a systematic code cannot be practically realized. Therefore, there is a need in the art for a systematic Raptor code having low coding complexity.

Additionally, an optimal coding method for the fountain code is needed in the art, because the number of received bits used for decoding is different according to the channel state.

SUMMARY OF THE INVENTION

An aspect of the present invention is to provide a coding apparatus and method for transmitting an information word together with parity bits in a communication system using a Raptor code as a type of fountain code.

Another aspect of the present invention is to provide a coding apparatus and method for controlling degrees of coded bits depending on the number of coded bits in a communication system using a Luby-Transform (LT) code.

A further aspect of the present invention is to provide a coding apparatus and method for selecting information bits of an LT code considering the number of coded bits in a communication system using an LT code.

In accordance with one aspect of the present invention, there is provided a method for channel coding by a transmitter in a communication system, including determining a degree of coded bits of an LT code based on a coding rate of a pre-code and the number of coded bits of the LT code, selecting at least one associated bit used for coding of the coded bits of the LT code from among information bits of the LT code, depending on the determined degree, and generating the coded bits of the LT code by applying a coding function to the selected associated bits.

In accordance with another aspect of the present invention, there is provided a channel coding apparatus included in a transmitter for a communication system, including a coded bit degree selector for determining a degree of coded bits of an LT code based on a coding rate of a pre-code and the number of coded bits of the LT code; an associated bit selector for selecting at least one associated bit used for coding of the coded bits of the LT code from among information bits of the LT code, depending on the determined degree, and a coded bit generator for generating coded bits of the LT code by applying a coding function to the selected associated bits.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

The present invention provides a coding apparatus and method for improving coding performance in a communication system that transmits an information word using a Raptor code. The terms 'information bits' and 'coded bits' as used herein may refer to bits constituting an information word and a codeword, respectively.

In addition, the present invention provides a coding apparatus and method for improving decoding performance regardless of a coding rate in a communication system using an LT coder.

A Raptor code according to the present invention is a type of fountain code enabling coding and decoding depending on the linearly-varying time and computation, and is a concatenated code of a pre-code and an LT code. The pre-code is used to restore the information bits that were not restored in the LT code.

In a coding process of the Raptor code, a pre-coder generates r redundant bits using k information bits. The k information bits and the r redundant bits will be referred to herein as 'intermediate bits'. Coded bits of the Raptor code may be generated by applying an LT coding process to the above-defined (k+r) intermediate bits. The generated coded bits of the Raptor code are transmitted over a communication channel. A receiver having received the coded bits of the Raptor code over the channel attempts to restore information bits from the received coded bits through decoding of the Raptor code.

A decoding process of the Raptor code is divided into a process of restoring intermediate bits through decoding of an LT code, and a process of restoring information bits through decoding of a pre-code. Optionally, the decoding of a pre-code and the decoding of an LT code may be performed in one process. A receiver should receive, from a transmitter, degrees of coded bits that the transmitter has used in generating coded bits of a Raptor code, and indexes of information bits used for coding, or should be able to generate the coded bits through the same process as that of the transmitter.

The Raptor code may be used in a systematic form in which its coded bits include information bits. A code in the form in which information bits are included in coded bits to be transmitted will be referred to herein as a 'systematic code'. When no loss occurs when an information word passes through a channel, if a systematic code is used, information bits may be restored even though the systematic code does not undergo a decoding process. However, as described above, the Raptor code of the prior art does not have the systematic characteristics due to its high coding complexity.

Figure 1:
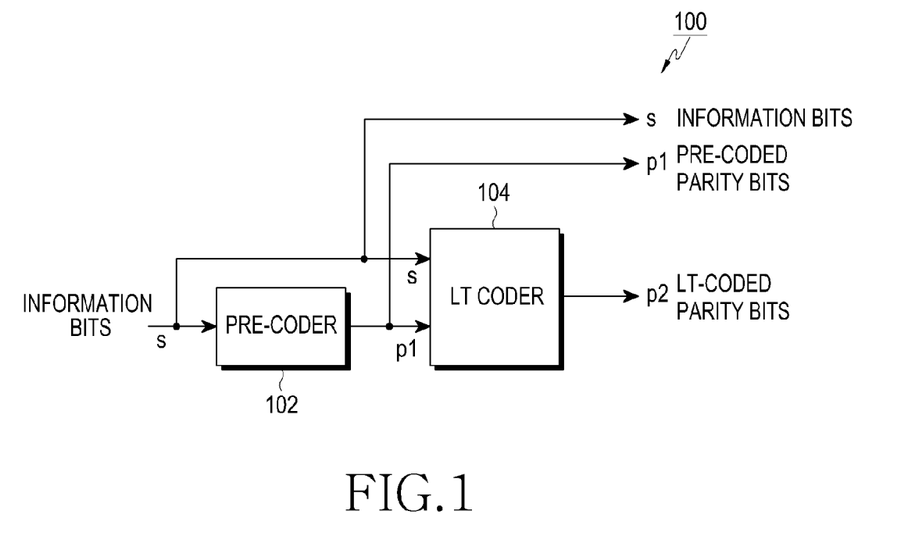
FIG. 1 illustrates a structure of a Raptor coder and an output flow of coded bits according to an embodiment of the present invention.

FIG. 1 illustrates a structure of a Raptor coder and an output flow of coded bits according to an embodiment of the present invention.

Referring to FIG. 1, a Raptor coder 100 includes a pre-coder 102 and an LT coder 104 concatenated to the pre-coder 102.

The pre-coder 102 outputs pre-coded parity bits p1 using input information bits s. The information bits s and the pre-coded parity bits p1 are provided as inputs to the LT coder 104, which outputs LT-coded parity bits p2 by applying a coding function to the input information bits s and pre-coded parity bits p1.

In order to distinguish between the bits (i.e., information bits s) being input to the pre-coder 102 and the bits (i.e., information bits s and pre-coded parity bits p1) being input to the LT coder 104, the former will be referred to as information bits of a Raptor code, and the latter will be referred to as information bits of an LT code. In addition, for convenience of description, the pre-coded parity bits p1 will be referred to as first parity bits, and coded bits of an LT code, which are output bits p2 of an LT code, will be referred to as second parity bits p2.

Therefore, although the coded bits of an LT code according to an embodiment of the present invention refer to only the LT-coded parity bits p2, it should be noted that the coded bits of a Raptor code according to an embodiment of the present invention refer to all of the information bits s of a Raptor code, the pre-coded parity bits p1, and the parity bits p2 of an LT code.

In other words, the Raptor coder 100 outputs the information bits s together with the pre-coded parity bits p1 and the LT-coded parity bits p2. The coded bits of a Raptor code according to the present invention have systematic characteristics, because they include the information bits s. A transmitter according to the present invention transmits the information bits s, the pre-coded parity bits p1, and the LT-coded parity bits p2 to a receiver over a communication channel.

As described above, decoding of a Raptor code is divided into a process of restoring intermediate bits through decoding of an LT code and a process of restoring information bits through decoding of a pre-code. For the decoding, a receiver should receive, from a transmitter, degrees of coded bits that the transmitter has used in generating coded bits of a Raptor code, and indexes of information bits used for coding, or should be able to generate the coded bits through the same process as that of the transmitter.

A length of the LT-coded parity bits p2 is not restrictive. If the channel condition is very good, a receiver may perform decoding based on the information bits s and the pre-coded parity bits p1. If the channel condition is relatively good, the receiver performs decoding based on some parity bits among the LT-coded parity bits p2 in addition to the information bits s and the pre-coded parity bits p1. If the channel condition is poor, the receiver performs decoding based on the information bits s, the pre-coded parity bits p1, and all of the LT-coded parity bits p2. It can be understood that the number of received bits used for decoding is different according to the channel condition, and particularly, the number of LT-coded parity bits used for decoding is significantly different according to the channel condition.

Therefore, a fountain code requires a method of adaptively generating an optimal LT codeword depending on the number of received bits, the number of which used for decoding is different according to the channel condition.

A coding method for improving decoding performance regardless of a coding rate in a communication system using an LT code will now be described in detail with reference to accompanying drawings.

In particular, a method of controlling degrees of coded bits according to the length of a codeword (i.e., the number of coded bits) in a communication system using an LT code will first be described, and a method of limiting information bits of an LT code, considering the number of coded bits will be described in detail with reference to FIG. 5.

One of coded bits of an LT code (i.e., second parity bits p2) may be calculated using a coding function that has one or more information bits of an LT code as a parameter. Each of the coded bits is generated independently of other coded bits. The possible number of coded bits generated is theoretically infinite, and may be limited to a certain value in particular applications.

A typical example of a coding function used to generate coded bits of an LT code may include a method of calculating coded bits of an LT code by performing an Exclusive OR (XOR) operation on information bits of an LT code. The information bits of an LT code used to calculate the coded bits of an LT code will be referred to herein as 'associated bits' for the coded bits of an LT code, and the number of associated bits will be referred to as 'degrees of coded bits of an LT code'.

Generally, as for an LT code, degree distribution for coded bits of the LT code may be represented in a polynomial as shown in Equation (1) below.

$$\Omega(x) = a_1 x + a_2 x^2 + \ldots + a_k x^k \quad (1)$$

where k represents the total number of information bits of an LT code, which are used in an LT coding procedure, and $a_i$ represents the probability that a degree of an arbitrarily selected coded bit of an LT code will be i. In other words, Equation (1) shows that the probability that a degree of an arbitrary coded bit of an LT code will be 1 is $a_1$, and the probability that a degree of an arbitrary coded bit of an LT code will be 2 is $a_2$. Similarly, the probability that a degree of an arbitrary coded bit of an LT code will be k is $a_k$. In Equation (1), $a_1 + a_2 + \ldots + a_k = 1$.

The degree distribution for coded bits of an LT code, shown in Equation (1), is an important factor in determining the performance of the LT code.

An LT coding process using an XOR function as a coding function may be summarized as follows.

LT Coding Process

Step 1: An optical degree is selected (or determined) considering given degree distribution for coded bits of an LT code.

Step 2: Different information bits of the LT code, the number of which corresponds to the selected degree, are randomly selected with equal probability.

Step 3: Coded bits of the LT code are generated by performing an XOR operation on the selected information bits.

The coded bits of an LT code, generated through the LT coding process, are transmitted over a communication channel by a transmitter, and a receiver receives the coded bits of the LT code and attempts to restore information bits of the LT code through decoding of the LT code.

The decoding of an LT code may be performed through message passing on a factor graph representing the LT code, or by a process of calculating a solution of a linear equation representing a relationship between information bits of the LT code and coded bits of the LT code. It should be noted that the receiver should receive, from the transmitter, degrees of coded bits of the LT code and indexes of information bits of the LT code, used for coding, or should be able to generate them through the same process as that of the transmitter.

Figure 2:
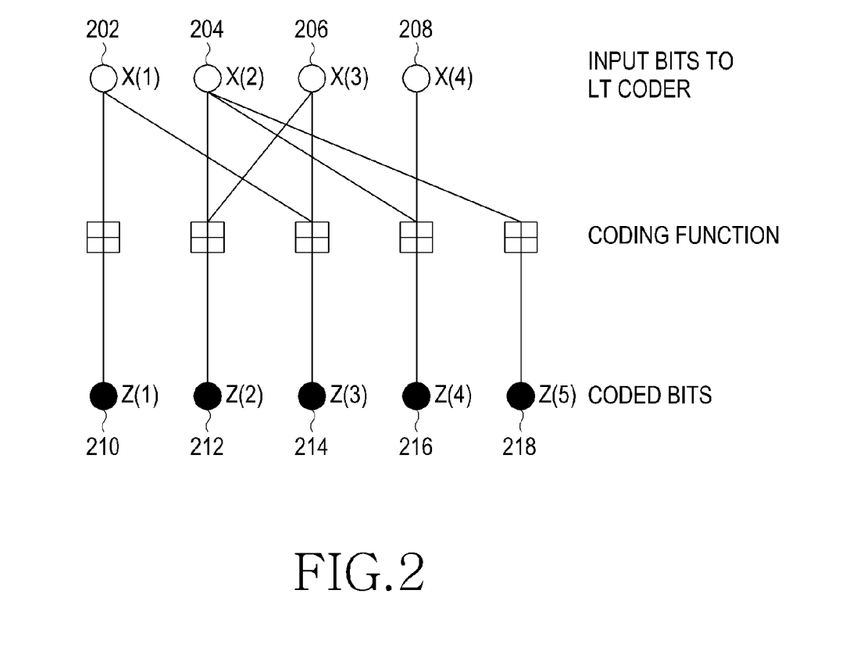
FIG. 2 illustrates an example of representing a coding process of an LT code on a factor graph according to an embodiment of the present invention.

FIG. 2 illustrates an example of representing a coding process of an LT code on a factor graph according to an embodiment of the present invention. The factor graph shown in FIG. 2 includes four information bits X(1) 202, X(2) 204, X(3) 206, and X(4) 208 of an LT code, and five coded bits Z(1) 210, Z(2) 212, Z(3) 214, Z(4) 216, and Z(5) 218 of the LT code. An XOR operation $\oplus$ is used as a coding function. The information bits of an LT code refer to bits received for LT coding.

A degree of an information bit refers to the number of times, of the information bit, being used in a coding function. And a degree of a coded bit may be expressed as the number of information bits being used by the coded bit for the coding function. Thus, in FIG. 2, information bits X(1), X(2), X(3), and X(4) have degrees of 2, 3, 2, and 1, respectively, and coded bits Z(1), Z(2), Z(3), Z(4), and Z(5) have degrees of 1, 2, 2, 2, and 1, respectively.

For the LT code shown in FIG. 2, relationships between information bits of the LT code and coded bits of the LT code may be defined as Equation (2) below.

$$Z(1) = X(1)$$

$$Z(2) = X(2) \oplus X(3)$$

$$Z(3) = X(1) \oplus X(3)$$

$$Z(4) = X(2) \oplus X(4)$$

$$Z(5) = X(2) \quad (2)$$

The degree distribution for coded bits of an LT code, shown in FIG. 2, may be defined as Equation (3) below.

$$\Omega(x) = \frac{2}{5}x + \frac{3}{5}x^2 \quad (3)$$

If the number of coded bits of an LT code is sufficient, information bits of the LT code may statistically have the same degree. However, the increase in the number of coded bits of an LT code reduces the decoding performance. The coded bits of an LT code have different degree distribution according to the number of the coded bits of the LT code. Therefore, a method of acquiring an optimal degree distribution for coded bits of an LT code is required.

Degree distribution for coded bits of an LT code according to an embodiment of the present invention may be calculated using the following rules.

Rule 1

Assuming that degree distribution for input information bits of an LT code is as uniform as possible, degrees of coded bits of the LT code are determined variously. In other words, degrees of variables x in Equation (1) are selected variously.

Rule 2

Noise thresholds may be maximized for the determined degrees of coded bits of the LT code. Values of the noise thresholds are calculated using the known differential evolution method.

In other words, the Raptor coder performs coding while variously changing the degrees of coded bits of the LT code, and calculates noise threshold values, which are maximum noise values where no error occurs when the coded code is decoded. Degree distribution with the largest noise threshold value may be selected from among the degree distributions.

Rule 3

An optimal degree distribution may be changed according to the number of coded bits of an LT code, which is divided according to the intervals, to calculate optimal degree distribution for each interval. Based on the optimal degree distribution for the existing interval, new optimal degree distribution may be calculated for a new interval. The entire interval may be divided into intervals in which the number of coded bits of an LT code is 0~X, X~Y, and Y~Z, respectively.

A method of calculating optimal degree distribution for coded bits of an LT code in accordance with the above rules will be described below with reference to the following tables.

For example, Table 1 shows degrees of coded bits of an LT code, which are optimized in a Binary Erasure Channel (BEC) channel, when a coding rate of a pre-code is ½. When a length of an information word is defined as k, $\Omega_1(x)$ represents degree distribution for coded bits, which is optimized for a codeword length shorter than 4.0 k, and $\Omega_2(x)$ represents degree distribution for coded bits, which is optimized for a codeword length which is longer than or to the same as 4.0 k and shorter than 6.0 k. In addition, $\Omega_3(x)$ represents degree distribution for coded bits, which is optimized for a codeword length longer than or to the same as 6.0 k.

TABLE 1

| # Bits to be transmitted | Output node degree distribution |
| --- | --- |
| 2.0k~4.0k | $\Omega_1(x) = x^3$ |
| 4.0k~6.0k | $\Omega_2(x) = 0.0397x^2 + 0.9603x^3$ |
| 6.0k~ | $\Omega_3(x) = 0.0098x + 0.4590x^2 + 0.2110x^3 + 0.1134x^4 + 0.1113x^{10} + 0.0799x^{11} + 0.0156x^{40}$. |

The degree distribution for coded bits of an LT code may be generated in different manners according to the channel and the coding rate of a pre-code.

Table 2 below shows optimized degree distributions for coded bits of an LT code, for a pre-code with a coding rate of ½ and an Additive White Gaussian Noise (AWGN) channel.

TABLE 2

| # received bits | Degree of output bits | | | | | | |
| --- | --- | --- | --- | --- | --- | --- | --- |
| | 1 | 2 | 3 | 4 | 10 | 11 | 40 |
| 0~0.0625K | 0 | 0 | 0 | 0.544 | 0.456 | 0 | 0 |
| 0.0625K~0.125K | 0 | 0 | 0 | 1.0 | 0 | 0 | 0 |
| 0.125K~0.25K | 0 | 0 | 0 | 1.0 | 0 | 0 | 0 |
| 0.25K~0.5K | 0 | 0 | 0.368 | 0.632 | 0 | 0 | 0 |
| 0.5K~1.0K | 0 | 0 | 0.675 | 0.325 | 0 | 0 | 0 |
| 1.0K~2.0K | 0 | 0 | 0.792 | 0.208 | 0 | 0 | 0 |
| 2.0K~4.0K | 0 | 0 | 0.877 | 0.047 | 0 | 0.066 | 0.010 |
| 4.0K~8.0K | 0 | 0.299 | 0.502 | 0 | 0.142 | 0.054 | 0.003 |

Table 3 below shows optimized degree distributions for coded bits of an LT code, for a pre-code with a coding rate of 0.95 and an AWGN channel.

TABLE 3

| # received bits | Degree of output bits | | | | | | |
| --- | --- | --- | --- | --- | --- | --- | --- |
| | 1 | 2 | 3 | 4 | 10 | 11 | 40 |
| 0~0.0625K | 0 | 0 | 0 | 0 | 0 | 0 | 1.0 |
| 0.0625K~0.125K | 0 | 0 | 0 | 0 | 0 | 1.0 | 0 |
| 0.125K~0.25K | 0 | 0 | 0 | 0 | 0 | 1.0 | 0 |
| 0.25K~0.5K | 0 | 0 | 0 | 0.008 | 0.986 | 0.006 | 0 |
| 0.5K~1.0K | 0 | 0 | 0 | 1.0 | 0 | 0 | 0 |
| 1.0K~2.0K | 0 | 0 | 0.134 | 0.866 | 0 | 0 | 0 |
| 2.0K~4.0K | 0 | 0 | 0.862 | 0 | 0 | 0.138 | 0 |
| 4.0K~8.0K | 0 | 0.293 | 0.501 | 0 | 0 | 0.206 | 0 |

Tables 2 and 3 are created based on the number of received bits. Using the number of received bits in Tables 2 and 3, the number of bits to be transmitted may be calculated in accordance with the following Equation 4:

$$\text{(the number of received bits)} + \text{(coding rate of a pre-code)}^{-1} * \text{(the number of pre-coded parity bits)} \quad (4)$$

In this manner, the Raptor coder according to the present invention transmits an information word together with parity bits and considers a coding rate and a length of coded bits of an LT code, thereby selecting the optimal degree distribution depending on the channel condition and performing coding according thereto, making it possible to generate a systematic Raptor code having low coding and decoding complexity.

Figure 3:
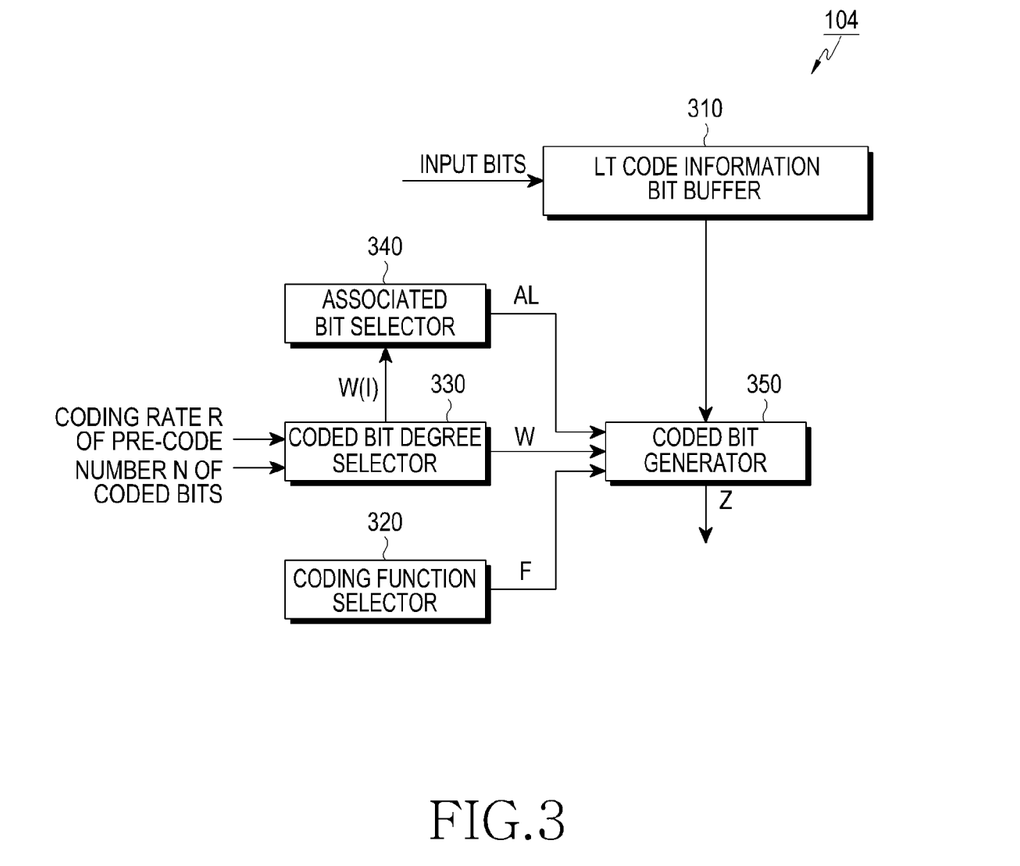
FIG. 3 illustrates a structure of an LT coder according to an embodiment of the present invention.

FIG. 3 illustrates a structure of an LT coder 104 according to an embodiment of the present invention. Referring to FIG. 3, the LT coder 104 includes an LT code information bit buffer 310, a coding function selector 320, a coded bit degree selector 330, an associated bit selector 340, and a coded bit generator 350. However, in its realization, the LT coder according to the present invention is not necessarily required to include all of the components shown in FIG. 3. In other words, the LT coder may include only some of the components shown in FIG. 3.

First, k information bits X(0), X(2), . . . , X(K−1) of an LT code, constituting one file or a part thereof, are sequentially stored in the LT code information bit buffer 310.

The coded bit degree selector 330 receives the number N (i.e., the number of coded bits of an LT code) of output bits of the coded bit generator 350 and a coding rate R of a pre-code. Optionally, the coding rate R of a pre-code and the number N of output bits may be received from another component, which may be a separately provided controller. Also, the coded bit degree selector 330 may determine the coding rate R of a pre-coder and the number N of output bits by itself, instead of selecting them from another component. The coded bit degree selector 330 selects a degree W of coded bits of an LT code based on the degree distribution acquired in accordance with the above-described rules. The degree W of coded bits of an LT code refers to the number of input bits required to generate coded bits of an LT code among k input bits (information bits of an LT code). A detailed operation of the coded bit degree selector 330 will be described below.

The coded bit degree selector 330 may select different degree distributions according to the number N of output bits. The degree distributions may be stored in a table. The coded bit degree selector 330 provides the selected degree W to the associated bit selector 340 and the coded bit generator 350.

The associated bit selector 340 receives the degree W, and selects at least one information bit (i.e., an associated bit) of an LT code for generating coded bits of an LT code, using the degree W. Specifically, the associated bit selector 340 may use a method of selecting associated bits by determining indexes of the associated bits, during which the associated bit selector 340 may store the indexes in a prescribed manner, or may persistently generate the indexes. When persistently generating the indexes, the associated bit selector 340 may generate the indexes using a specific key value. By allowing even a receiver to know the key value, an index of the associated bit used for LT coding may be used for decoding. A detailed operation of the associated bit selector 340 will be described below.

The associated bit selector 340 may generate an Associated-bit List (AL) by the selected at least one associated bit. The associated-bit list AL is a list of indexes indicating as many input bits as the selected degree W among the k input bits (i.e., information bits of an LT code). The associated bit selector 340 provides the generated associated-bit list AL to the coded bit generator 350.

The coded bit generator 350 generates and outputs coded bits Z by applying a coding function to as many input bits as the degree W among the k input bits stored in the LT code information bit buffer 310, using the degree W of coded bits of an LT code, provided from the coded bit degree selector 330, and the associated-bit list AL provided from the associated bit selector 340.

Optionally, the coding function selector 320 may be additionally provided to selectively use a coding function F applied to generate the coded bits. The coding function F is assumed to be an XOR function in an embodiment of the present invention.

Figure 4:
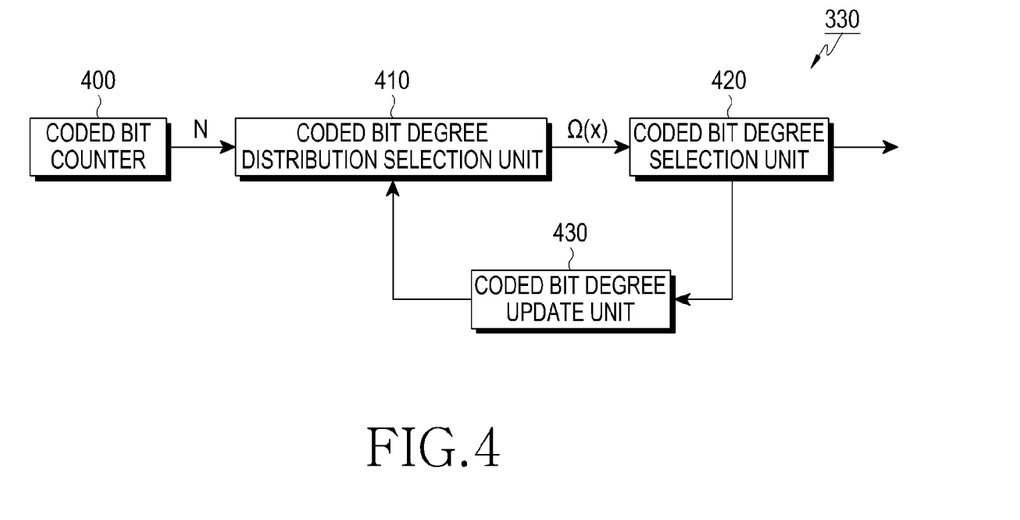
FIG. 4 illustrates a structure of a coded bit degree selector according to an embodiment of the present invention.

FIG. 4 illustrates a structure of a coded bit degree selector 330 according to an embodiment of the present invention.

The coded bit degree selector 330 controls degrees of coded bits of an LT code. Referring to FIG. 4, the coded bit degree selector 330 includes a coded bit counter 400, a coded bit degree distribution selection unit 410, a coded bit degree selection unit 420, and a coded bit degree update unit 430.

The coded bit counter 400 outputs the number N of output bits of the coded bit generator 350 and/or a coding rate R of a pre-code to the coded bit degree distribution selection unit 410. The number N of output bits and/or the coding rate R of a pre-code may be a value(s) being input to the coded bit counter 400 from another component such as a controller, or may be a value(s) that the coded bit counter 400 has calculated. Although the coded bit counter 400 is assumed to be realized in the coded bit degree selector 330, it will be obvious to those skilled in the art that the coded bit counter 400 may be realized outside the coded bit degree selector 330.

The coded bit degree distribution selection unit 410 selects an optimal degree distribution for coded bits based on the number N of output bits and/or the coding rage R of a pre-code, received from the coded bit counter 400. For example, the coded bit degree distribution selection unit 410 selects the optimal degree distribution from among degree distributions $\Omega(x)$ for coded bits, given in Tables 1 to 3.

The coded bit degree selection unit 420 determines the current degree of coded bits based on the degree distribution $\Omega(x)$ received from the coded bit degree distribution selection unit 410.

The coded bit degree update unit 430 updates the current degree of coded bits according to the degree selected by the coded bit degree selection unit 420. For example, if the coded bit degree distribution selection unit 410 selects a degree distribution $\Omega(x)=2/10 \ x^2+8/10 \ x^{10}$, the coded bit degree selection unit 420 selects one of the degrees 2 and 10. If the coded bit degree selection unit 420 selects the degree 10, the coded bit degree update unit 430 updates coefficients 2/10 and 8/10 of the degree distribution $\Omega(x)$. Therefore, when 10 output bits are generated, one of the 10 output bits is selected and the other 9 output bits are left unselected. Thus, coefficients of the degree distribution $\Omega(x)$ for coded bits are updated to 2/9 and 7/9.

While the components of the coded bit degree selector 330 for controlling degrees of coded bits according to the present invention have been described so far with reference to FIG. 4, the present invention is not limited thereto. In other words, input and output signals of the components may have various forms according to the implementation of the present invention, and some components may be omitted. In addition, it will be obvious to those skilled in the art that some components may be integrated, or may include an additional control signal.

Figure 5:
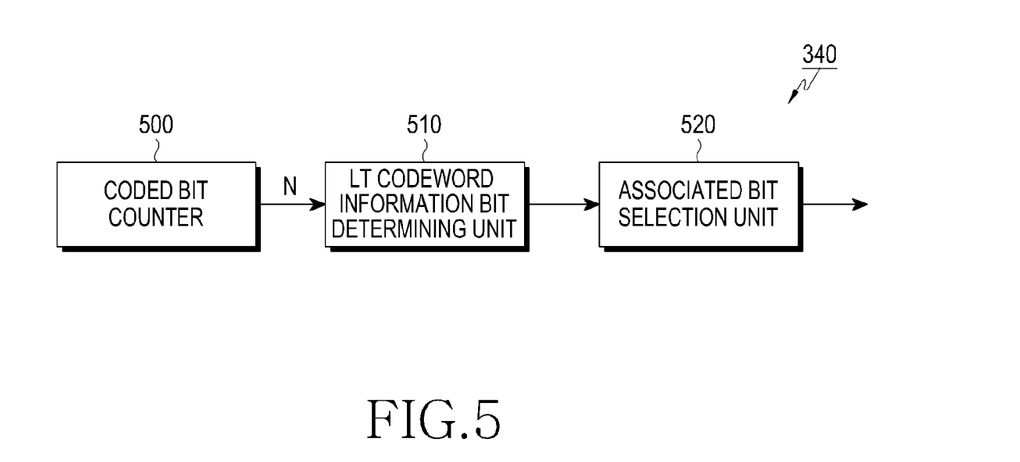
FIG. 5 illustrates a structure of an associated bit selector according to an embodiment of the present invention.

FIG. 5 illustrates a structure of an associated bit selector 340 according to an embodiment of the present invention.

The associated bit selector 340 selects information bits of an LT code considering the number of coded bits of the LT code. Referring to FIG. 5, the associated bit selector 340 includes a coded bit counter 500, an LT codeword information bit determining unit 510, and an associated bit selection unit 520.

The coded bit counter 500 calculates the number N of coded bits output up to the present, and outputs N to the LT codeword information bit determining unit 510. Although the coded bit counter 500 is assumed to be realized in the associated bit selector 340, the present invention is not limited thereto. In other words, the coded bit counter 500 may be realized outside the associated bit selector 340.

The LT codeword information bit determining unit 510 selects some of the information bits s of a Raptor code and the pre-coded parity bits p1 (i.e., first parity bits) in FIG. 1, using the number N of coded bits, received from the coded bit counter 500, and outputs the selected part to the associated bit selection unit 520. To be specific, when a decoder uses more coded bits p2 of an LT code (i.e., second parity bits) due to the poor channel condition, a coding rate of a pre-coded codeword should be increased to improve the decoding performance. When the decoder uses fewer coded bits p2 of an LT code (i.e., second parity bits) due to the good channel condition, a coding rate of the pre-coded codeword should be decreased to improve the decoding performance. Therefore, the LT codeword information bit determining unit 510 may improve the decoding performance by limiting the bits (i.e., information bits of an LT code) being input to the LT coder to some bits according to a value of the received N.

For example, it is assumed that the information bits of a Raptor code shown in FIG. 1 are $s=(s1, s2, s2, \ldots, s100)$, and the first parity bits are $p1=(p1,1, p1,2, \ldots, p1,50)$. The information bits s of a Raptor code and the first parity bits p1 are information bits of an LT code. The LT codeword information bit determining unit 510 may select the information bits $s=(s1, s2, s2, \ldots, s100)$ of a Raptor code and some parity bits p1'=(p1,1, p1,2, ..., p1,10) among the first parity bits based on the number N of coded bits, received from the coded bit counter 500.

The associated bit selection unit 520 selects as many associated bits as the degree W selected by the coded bit degree selector 330 from among the bits selected by the LT codeword information bit determining unit 510, and provides the selected associated bits to the coded bit generator 350.

While the components of the associated bit selector 340 for selecting the information bits of an LT code considering the number of coded bits have been described so far with reference to FIG. 5, the present invention is not limited thereto. In other words, input and output signals of the components may have various forms according to the implementation of the present invention, and some components may be omitted. In addition, it will be obvious to those skilled in the art that some components may be integrated, or may include an additional control signal.

Figure 6:
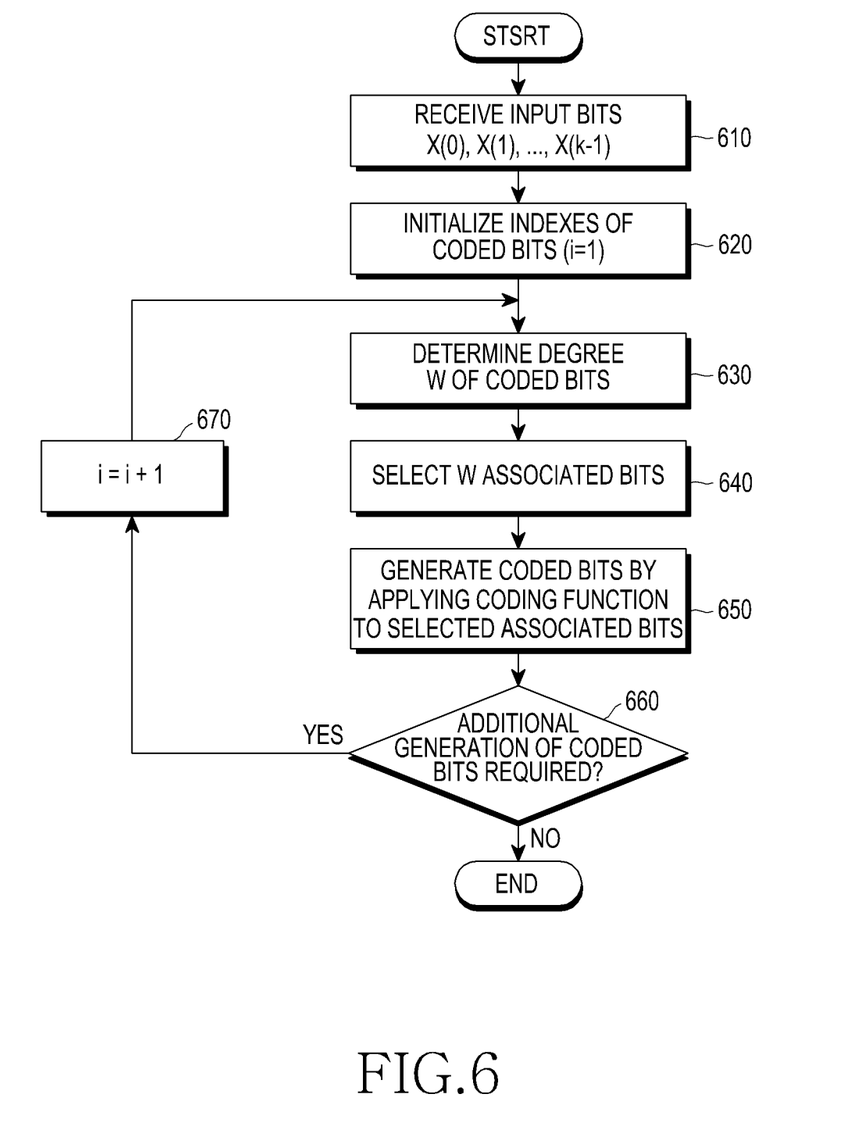
FIG. 6 illustrates an example of an LT coding procedure performed by an LT coder included in a transmitter according to an embodiment of the present invention.

FIG. 6 illustrates an example of an LT coding procedure performed by an LT coder included in a transmitter according to an embodiment of the present invention.

Referring to FIG. 6, the LT coder in the transmitter receives input bits (information bits of an LT code) X(0), X(1), ..., X(k-1) in step 610. The input bits include the information bits s of a Raptor code and the pre-coded parity bits p1 shown in FIG. 1.

In step 620, the LT coder initializes indexes of coded bits of the LT code before performing an LT coding process based on the input bits. For example, a parameter i indicating the index may be initialized to 1.

In step 630, the LT coder selects the optimal degree distribution based on the number N of coded bits of the LT code and the coding rate R of the pre-code, and selects (or determines) a degree W of the coded bits of the LT code based on the selected degree distribution. The degree W of the coded bits refers to the number of input bits required to generate coded bits of the LT code among the k input bits.

In step 640, the LT coder selects as many associated bits as the degree W of coded bits from among the input bits X(0), X(1), ..., X(k-1).

In step 650, the LT coder generates coded bits of the LT code based on the degree W of coded bits of the LT code and the selected associated bits. In other words, the LT coder generates coded bits by applying a coding function to as many associated bits as the degree W of coded bits of the LT code among the k input bits.

In step 660, the LT coder determines whether there are coded codes to be additionally generated. For example, the LT coder determines whether the number N of coded bits of the LT code, to be generated, is equal to the index i. If there is a need for additional generation of coded bits (e.g., i<N), the LT coder increases the index i by 1 in step 670, and then repeats steps 630 to 650.

However, if there is no need for additional generation of coded bits (e.g., i>=N), the LT coder ends the coding operation of generating coded bits based on input bits.

As is apparent from the foregoing description, the present invention discloses a Raptor code transferring information bits with coded bits of an LT coder, thereby realizing a systematic Raptor code having low coding complexity.

In addition, the present invention selects the optimal degree distribution for coded bits according to the length of a codeword in a communication system using an LT code, thereby improving the coding and decoding performance.

The communication channel may include not only the wire/wireless channels on which a transmitter and a receiver are separated spatially, but also a temporal channel in which information is stored on a storage medium in advance and the desired information is read out when necessary, and a mixed channel of the spatial channel and the temporal channel.

In addition, the information carried by the communication channel may include not only the common text and voice information, but also multimedia information such as video and/or audio files, and signaling information and a data file for specific applications.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for channel coding by a transmitter in a communication system, comprising:
    selecting a degree distribution for coded bits of a Luby-Transform (LT) code based on a coding rate of a pre-code and a number of the coded bits of the LT code, wherein the LT code is divided into intervals and the degree distribution is set in respective intervals;
    selecting a degree of the coded bits depending on the selected degree distribution;
    selecting at least one associated bit used for coding of the coded bits of the LT code from among information bits of the LT code, depending on the selected degree of the coded bits; and
    generating the coded bits of the LT code by applying a coding function to the selected associated bits.

2. The method of claim 1, wherein the degree distribution is a degree distribution maximizing a noise threshold calculated by a differential evolution method.

3. The method of claim 1, wherein the selecting at least one associated bit comprises:
    limiting the information bits of the LT code, which can be selected as the associated bits, to some but not all bits depending on the number of coded bits of the LT code; and
    selecting the associated bits from the some bits of the information bits of the LT code.

4. The method of claim 1, further comprising transmitting the information bits of the LT code together with the generated coded bits of the LT code.

5. The method of claim 4, wherein the information bits of the LT code include information bits being input to the pre-code.

6. A channel coding apparatus included in a transmitter for a communication system, comprising:
    a coded bit degree selector for selecting a degree distribution for coded bits of a Luby-Transform (LT) code based on a coding rate of a pre-code and a number of the coded bits of the LT code, wherein the LT code is divided into intervals and the degree distribution is set in respective intervals, and selecting a degree of the coded bits depending on the selected degree distribution;
    an associated bit selector for selecting at least one associated bit used for coding of the coded bits of the LT code from among information bits of the LT code, depending on the selected degree; and
    a coded bit generator for generating coded bits of the LT code by applying a coding function to the selected associated bits.

7. The channel coding apparatus of claim 6, wherein the degree distribution maximizes a noise threshold calculated by a differential evolution method.

8. The channel coding apparatus of claim 6, wherein the associated bit selector limits the information bits of the LT code, which can be selected as the associated bits, to some but not all bits depending on the number of coded bits of the LT code, and selects the associated bits from the some bits of the information bits of the LT code.

9. The channel coding apparatus of claim 6, wherein the information bits of the LT code are transmitted together with the coded bits of the LT code, which are output from the coded bit generator.

10. The channel coding apparatus of claim 9, wherein the information bits of the LT code include information bits being input to the pre-code.

11. The method of claim 1, wherein the degree distribution is selected from a table in which the coded bits are set in respective intervals, and optimal degree distributions are respectively linked to the intervals.

12. The channel coding apparatus of claim 6, wherein the coded bit degree selector selects the degree of the coded bits based on the degree distribution selected from a table in which the coded bits are set in respective intervals, and optimal degree distributions are respectively linked to the intervals.

* * * * *